United States Patent
Wu

(10) Patent No.: US 12,437,012 B2
(45) Date of Patent: *Oct. 7, 2025

(54) AUTONOMOUSLY PROVIDING SEARCH RESULTS POST-FACTO, INCLUDING IN ASSISTANT CONTEXT

(71) Applicant: GOOGLE LLC, Mountain View, CA (US)

(72) Inventor: Xi Wu, Beijing (CN)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/648,827

(22) Filed: Apr. 29, 2024

(65) Prior Publication Data

US 2024/0273152 A1     Aug. 15, 2024

Related U.S. Application Data

(63) Continuation of application No. 17/572,452, filed on Jan. 10, 2022, now Pat. No. 11,971,935, which is a
(Continued)

(51) Int. Cl.
    *G06F 16/435*     (2019.01)
    *G06F 16/2457*     (2019.01)
    (Continued)

(52) U.S. Cl.
    CPC .... *G06F 16/9535* (2019.01); *G06F 16/24578* (2019.01); *G06F 16/248* (2019.01);
(Continued)

(58) Field of Classification Search
    CPC .......... G06F 16/9535; G06F 16/24578; G06F 16/248; G06F 16/435; G06F 16/954;
(Continued)

(56) References Cited

U.S. PATENT DOCUMENTS 7,792,709 B1 *   9/2010   Trandal .............. G06Q 30/0601
                                                    705/26.1
7,912,852 B1     3/2011   McElroy
(Continued)

FOREIGN PATENT DOCUMENTS

CN     101290718     10/2008
CN     102436510     5/2012
(Continued)

OTHER PUBLICATIONS

European Patent Office; Intention to Grant issued for Application No. 16921672.8, 50 pages, dated Oct. 26, 2023.
(Continued)

*Primary Examiner* — Marcin R Filipczyk
(74) *Attorney, Agent, or Firm* — Gray Ice Higdon

(57) ABSTRACT

Methods, apparatus, and computer readable media related to determining that no resources responsive to a query of a user at a first time satisfy one or more criteria (e.g., one or more quality criteria) and, in response to such a determination: providing for presentation to the user at a later time, content that is based on a given resource that is responsive to the query at the later time and that satisfies the criteria. The given resource that is responsive to the query at the later time may be a resource that is in addition to any resources responsive to the query at the first time or may be a refined version of a resource that was responsive to the query at the first time.

15 Claims, 9 Drawing Sheets

Related U.S. Application Data continuation of application No. 15/720,769, filed on Sep. 29, 2017, now Pat. No. 11,238,116, which is a continuation of application No. PCT/CN2016/106450, filed on Nov. 18, 2016.

(51) Int. Cl.
  *G06F 16/248*   (2019.01)
  *G06F 16/9535*  (2019.01)
  *G06F 16/954*   (2019.01)
  *G06F 16/957*   (2019.01)

(52) U.S. Cl.
  CPC .......... *G06F 16/435* (2019.01); *G06F 16/954* (2019.01); *G06F 16/957* (2019.01)

(58) Field of Classification Search
  CPC .... G06F 16/957; G06F 16/9536; G06F 3/167; G06F 16/433; G06F 16/3329; G06F 16/9024; G06F 16/90332; G10L 15/22; G10L 2015/223; Y10S 715/978
  See application file for complete search history.

(56) References Cited

U.S. PATENT DOCUMENTS

| | | | |
|---|---|---|---|
| 8,458,177 | B2 | 6/2013 | Athsani et al. |
| 9,031,216 | B1 | 5/2015 | Kamvar |
| 10,685,187 | B2 | 6/2020 | Badr et al. |
| 10,747,804 | B2 * | 8/2020 | Rakshit .................. G06F 16/29 |
| 11,238,116 | B2 | 2/2022 | Wu |
| 11,550,846 | B2 * | 1/2023 | Lewis ............... G06F 16/90332 |
| 2008/0281817 | A1 | 11/2008 | White |
| 2010/0057687 | A1 | 3/2010 | Shen et al. |
| 2015/0142704 | A1 | 5/2015 | London |
| 2015/0339707 | A1 | 11/2015 | Harrison et al. |
| 2017/0279747 | A1 * | 9/2017 | Melzer ............... G06Q 30/0635 |
| 2018/0144055 | A1 | 5/2018 | Wu |
| 2022/0129513 | A1 | 4/2022 | Wu |

FOREIGN PATENT DOCUMENTS

| | | |
|---|---|---|
| CN | 102841904 | 12/2012 |
| CN | 105224586 | 1/2016 |
| CN | 105279158 | 1/2016 |
| CN | 105354283 | 2/2016 |
| CN | 105608218 | 5/2016 |
| CN | 105989120 | 10/2016 |
| CN | 105991312 | 10/2016 |
| CN | 107209781 | 9/2017 |
| JP | H09245053 | 9/1997 |
| JP | 2002169818 | 6/2002 |
| JP | 2013069240 | 4/2013 |
| JP | 2014222514 | 11/2014 |
| JP | 2015152868 | 8/2015 |
| JP | 2016103270 | 6/2016 |
| KR | 20140019122 | 2/2014 |
| KR | 20140091136 | 7/2014 |
| WO | 2014197635 | 12/2014 |
| WO | 2018090338 | 5/2018 |

OTHER PUBLICATIONS

European Patent Office; Summons issued in Application No. 16921672.8; 8 pages; dated Feb. 3, 2023.
Korean Patent Office; Notice of Allowance issued in Application No. KR 10-2022-7001307; 3 pages; dated Apr. 25, 2023.
Korean Patent Office; Office Action issued in Application No. KR 10-2022-7001307; 7 pages; dated Oct. 20, 2022.
Japanese Patent Office; Notice of Allowance issued in App. No. 2021-100131, 3 pages, dated Aug. 15, 2022.
Korean Patent Office; Office Action issued in Application No. KR 10-2022-7001307; 8 pages; dated Apr. 23, 2022.
European Patent Office; Communication Pursuant to Article 94(3) EPC issued in Application No. 16921672.8; 5 pages; dated Jun. 2, 2021.
China National Intellectual Property Administration; Notification of First Office Action issued in Application No. 201710908300.3; 40 pages; dated May 7, 2021.
Korean Patent Office; Notice of Allowance issued for Application No. 10-2019-7017380; 3 pages; dated Oct. 20, 2021.
European Patent Office; Preliminary Opinion issued for Application No. 16921672.8, 11 pages, dated Oct. 9, 2023.
Japanese Patent Office; Notice of Reasons for Rejection issued for Application No. 2022146122, 9 pages, dated Oct. 16, 2023.
International Search Report and Written Opinion of PCT Ser. No. PCT/US2016/066688; 11 pages Jun. 21, 2017.
Great Britain Intellectual Property Office; Examination Report issued in Application No. 1715665.4 dated Feb. 16, 2018.
European Patent Office; Extended European Search Report issued in Application No. 16921672.8; 7 pages; dated Sep. 23, 2019.
Korean Intellectual Property Office: Office Action issued for Application No. 10-2019-7017380 dated Sep. 28, 2020.
Japan Patent Office: Office Action issued for Application No. 2019-527233 dated Oct. 12, 2020.
Korean Patent Office; Office Action issued for Application No. 10-2019-7017380; 9 pages; dated Apr. 28, 2021.
Intellectual Property India; Examination Report issued in Application No. 201927020695; 4 pages; dated May 14, 2021.
Japanese Patent Office; Notice of Allowance issued in Application No. 2019-527233; 3 pages; dated May 17, 2021.
China National Intellectual Property Administration; Notification of First Office Action issued in Application No. 202210070976.0; 20 pages; dated Apr. 15, 2025.

* cited by examiner

AUTONOMOUSLY PROVIDING SEARCH RESULTS POST-FACTO, INCLUDING IN ASSISTANT CONTEXT

BACKGROUND

Search engines provide information about various resources in response to queries submitted to the search engines. For example, in response to a user's query, a search engine may identify resources that are responsive to the query, and provide search results that include aspects of and/or links to the identified resources. However, in response to some queries, a search engine may not be able to provide any search results and/or may be unable to provide one or more search result(s) that are of sufficient quality. This may be due to various circumstances, such as the information the user is seeking via the query not yet being available (and therefore inaccessible to the search engine) and/or the search engine (or associated components) not yet appropriately indexing or otherwise storing the information.

For example, assume a user query of "what is the release date for Acme's widget?", which seeks a release date for a fictional product ("widget") manufactured by a fictional company (Acme). If the release date is publicly available on webpages and/or other Internet resources, the search engine may be able to provide one or more search results that are of high quality and provide the user with the information sought (i.e., the release date). For instance, the release date may be provided by the search engine as an authoritative answer search result for presentation more prominently than any other search results and/or may be provided in a snippet of another search result along with a link to the underlying resource of the other search result. However, if the release date is not publicly available, the search engine may be unable to provide any high quality search results—or may even possibly be unable to provide any search results at all.

SUMMARY

This specification is directed to methods, apparatus, and computer readable media related to determining that no resources responsive to a query of a user at a first time satisfy one or more criteria (e.g., one or more quality criteria) and, in response to such a determination: providing for presentation to the user at a later time, content (e.g. a search result) that is based on a given resource that is responsive to the query at the later time and that satisfies the criteria. The given resource that is responsive to the query at the later time may be a resource that is in addition to any resources responsive to the query at the first time or may be a refined version of a resource that was responsive to the query at the first time (e.g., a refined version of an entry in a knowledge graph or other database).

The content that is based on the given resource is provided for presentation to the user at the later time via a computing device of the user and may be provided for presentation to the user without requiring the user to again submit the query and/or another query seeking similar information. For example, the content may be surfaced to the user via a visual and/or audible notification on a mobile computing device of the user, and may be surfaced independent of the user again submitting the query and/or another query. Also, for example, the content may be presented as visual and/or audible output of an automated assistant during a dialog session between the user and the automated assistant, where the dialog session is unrelated to the query and/or another query seeking similar information.

Some of these and other implementations of the specification may achieve various technical advantages. For example, providing the content for presentation to the user without requiring the user to again submit the query and/or another query seeking similar information may reduce the use of various computational resources, such as resources that would otherwise be consumed by the user in again submitting the query and/or another query seeking similar information. Also, for example, in some implementations a prompt or other notification may be provided for presentation to the user in response to determining that no resources responsive to a query of the user satisfy one or more criteria. In some of those implementations, the prompt may inform the user of the lack of resources that satisfy the criteria and/or inform the user that if resources that satisfy the criteria are subsequently available, associated content will be automatically provided to the user. This may cause the user to await the pushing or other providing of such content in lieu of the user issuing computationally expensive follow-up search(es) that seek the same information of the query. Additional and/or alternative technical advantages may be achieved, such as those described elsewhere herein.

In some implementations, a method performed by one or more processors is provided that includes receiving a query of a user at a first time and, in response to receiving the query, causing a search of one or more databases to be issued based on the query. The method further includes: obtaining, in response to the search, one or more resources that are responsive to the query at the first time; and determining that none of the resources that are responsive to the query at the first time satisfy one or more criteria. The method further includes determining, at a second time subsequent to the first time, that a given resource that is responsive to the query at the second time satisfies the criteria. The given resource is in addition to the resources that are responsive to the query at the first time or is a refined version of one of the resources that are responsive to the query at the first time. The method further includes providing, for presentation to the user via a computing device of the user, content that is based on the given resource that is responsive to the query at the second time. The providing is based on determining that none of the resources that were responsive to the query at the first time satisfied the criteria and based on determining that the given resource that is responsive to the query at the second time satisfies the criteria.

These and other implementations of technology disclosed herein may optionally include one or more of the following features.

In some implementations, the one or more criteria include a quality criterion. In some of those implementations, the quality criterion is having an indication, in one or more of the databases, as an authoritative answer to the query.

In some implementations, the method further includes: in response to determining that none of the resources that are responsive to the query at the first time satisfy the criteria: providing, for presentation to the user via a user interface output device, a prompt related to none of the resources that are responsive to the query at the first time satisfying the criteria, and receiving further user interface input from the user in response to the prompt. In those implementations, providing the content that is based on the given resource may be contingent on receiving the further user interface input from the user in response to the prompt.

In some implementations, the given resource is an entry of one of the databases and determining that the given resource satisfies the criteria at the second time includes determining that a field for the entry contains a value at the second time that indicates desired information for the query. In some of those implementations: the given resource was responsive to the query at the first time, but did not include the value at the first time; and determining that the given resource did not satisfy the criteria at the first time includes: determining that any value contained in the field for the entry at the first time does not indicate desired information for the query.

In some implementations, the method further includes: receiving, subsequent to the first time, further user interface input that is unrelated to the query and that is provided by the user via the computing device; and providing the content that is based on the given resource based on receiving the further user interface input. In some of those implementations, the method further includes: providing, for presentation to the user via the computing device, initial responsive output that is responsive to the further user interface input; and providing the content occurs following providing the initial responsive output and optionally occurs without receiving any additional input provided by the user after the further user interface input.

In some implementations, the query is received on an additional computing device that is in addition to the computing device for which the content is provided for presentation to the user.

In some implementations, a method performed by one or more processors is provided that includes determining that none of any resources responsive to a query of a user at a first time satisfy one or more criteria. The method further includes, in response to determining that none of the any resources responsive to the query at the first time satisfy the criteria, monitoring for presence of a given resource that is responsive to the query and that satisfies the criteria. The given resource is in addition to the resources that are responsive to the query at the first time or is a refined version of one of the resources that are responsive to the query at the first time. The method further includes, based on determining the presence of the given resource, providing content that is based on the given resource. The content is provided for presentation to the user via a computing device of the user, These and other implementations of technology disclosed herein may optionally include one or more of the following features.

In some implementations, the method further includes: receiving, subsequent to the first time, further user interface input that is unrelated to the query and that is provided by the user via the computing device; and providing the content that is based on the given resource based on receiving the further user interface input. In some of those implementations, the method further includes: providing, for presentation to the user via the computing device, initial responsive output that is responsive to the further user interface input; and providing the content occurs following providing the initial responsive output and optionally occurs without receiving any additional input provided by the user after the further user interface input.

In some implementations, the query is received on an additional computing device that is in addition to the computing device for which the content is provided for presentation to the user.

In some implementations, the one or more criteria comprise a quality criterion. In some of those implementations, the quality criterion is having an indication, in one or more databases, as an authoritative answer to the query.

In some implementations, a method performed by one or more processors is provided that includes, in a dialog session between a user and an automated assistant implemented by one or more of the processors: receiving a query from the user as part of the dialog session; and determining that none of any resources responsive to the query satisfy one or more criteria. The query is based on user interface input generated by a user via a user interface input device, and the query is directed to the automated assistant as part of the dialog session. The method further includes, in response to determining that none of the any resources responsive to the query at the first time satisfy the criteria: monitoring for presence of a given resource that is responsive to the query and that satisfies the criteria. The method further includes, in a subsequent dialog session between the user and the automated assistant, and based on determining the presence of the given resource: providing, for presentation to the user as output from the automated assistant as part of the subsequent dialog session, content that is based on the given resource that is responsive to the query and that satisfies the criteria.

These and other implementations of technology disclosed herein may optionally include one or more of the following features.

In some implementations, the method further includes, in the dialog session and in response to determining that none of the resources that are responsive to the query satisfy the criteria: providing, for presentation to the user as output from the automated assistant as part of the dialog session, a prompt related to none of the resources that are responsive to the query satisfying the criteria; and receiving further user interface input from the user in response to the prompt. In some of those implementations, providing, in the subsequent dialog session, the content that is based on the given resource is contingent on receiving the further user interface input from the user in response to the prompt.

In some implementations, the method further includes, in the subsequent dialog session, receiving further user interface input from the user as part of the subsequent dialog session. The further user interface input is unrelated to the query and providing the content that is based on the given resource is based on receiving the further user interface input. In some of those implementations, the method further includes, in the subsequent dialog session: providing, for presentation to the user as output from the automated assistant as part of the subsequent dialog session, initial responsive output that is responsive to the further user interface input. In those implementations, providing the content may occur following providing the initial responsive output and/or may occur without receiving any additional input provided by the user after the further user interface input.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
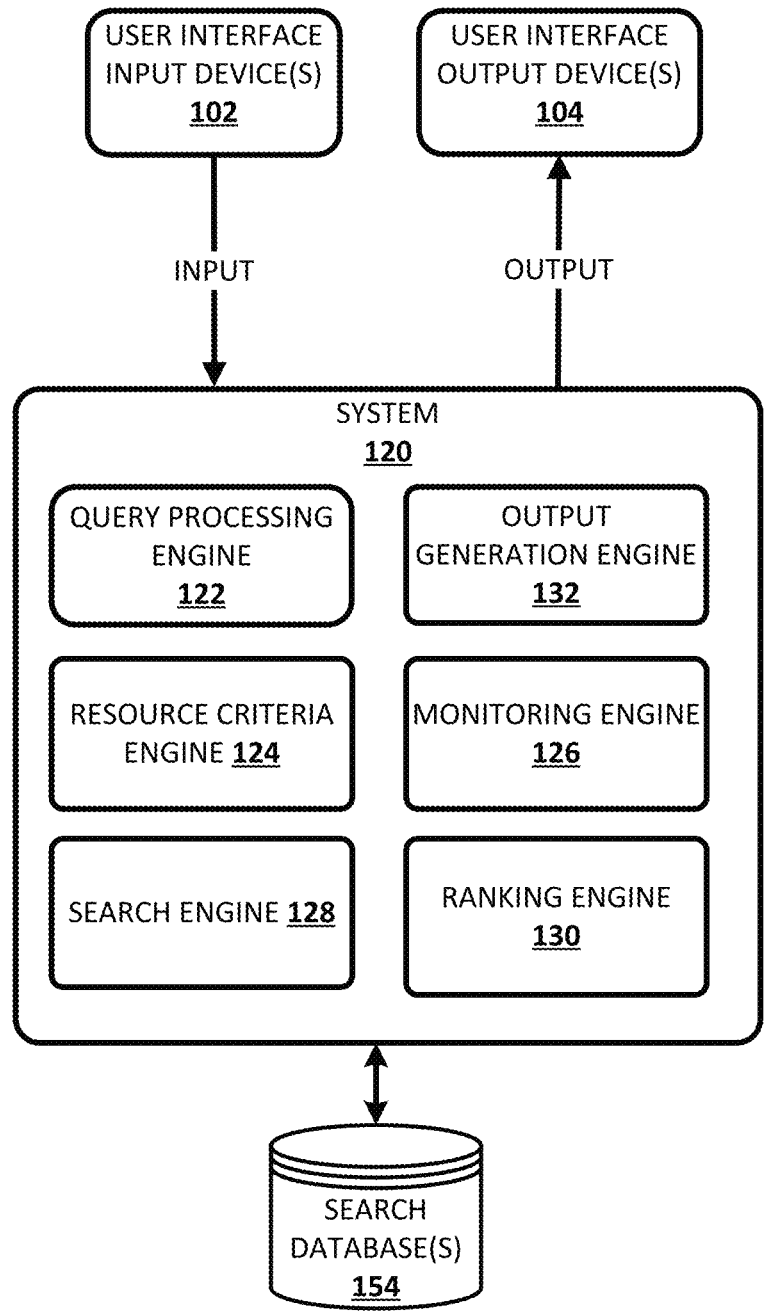
FIG. 1 is a block diagram of an example environment in which implementations disclosed herein may be implemented.

Some implementations described herein relate to determining that no resources responsive to a query of a user at a first time satisfy one or more criteria (e.g., one or more quality criteria) and, in response to such a determination: providing for presentation to the user at a later time, content that is based on a given resource that is responsive to the query at the later time and that satisfies the criteria. The given resource that is responsive to the query at the later time may be a resource that is in addition to any resources responsive to the query at the first time or may be a refined version of a resource that was responsive to the query at the first time. The content that is based on the given resource is provided for presentation to the user at the later time via a computing device of the user and may be provided for presentation to the user without requiring the user to again submit the query and/or another query seeking similar information.

As one example, assume a user query of "what time does Team A play Team B", which seeks a time for a game between fictional sports teams ("Team A" and "Team B"). Further assume the time of the game has not yet been announced.

A search of one or more databases can be issued based on the query and one or more resources (if any) that are responsive to the search identified. One or more features of the resources can be utilized to determine that none of those resources satisfy one or more quality criteria. For example, the quality criteria of a resource may be that one or more search ranking signals for the resource and/or a cumulative ranking score for the resource satisfy one or more thresholds. As another example, a quality criterion of a resource may be that it has an indication, one or more databases, as including content that is an authoritative answer to the query. For instance, some resources may be deemed as including content that is an authoritative answer to one or more queries and such content may be presented prominently in response to such queries (e.g., presented as the only responsive content or presented more prominently than other content). For instance, an authoritative answer may be visually presented in a so-called "one box" and/or audibly recited to the user (whereas content from other responsive resources, if any, may not). As yet another example, a quality criterion of a resource that is an entry in a knowledge graph or other resource may be that the entry includes a field that contains a value that indicates the desired information for the query.

In response to determining that none of the responsive resources satisfy one or more quality criteria, data may be stored in association with the user that causes content from a subsequently identified resource, which satisfies the criteria, to be provided for presentation to the user at a future time.

Subsequent to the time of the user query, it can be determined that a given resource that satisfies the quality criteria is present and satisfies the quality criteria. For example, the given resource may be a resource that has subsequently been deemed as including authoritative content for the query (and optionally one or more other queries). Also, for example, the given resource may be an entry of a database (e.g., a knowledge graph) that includes one or more fields that have been updated to include value(s) that are responsive to the query (whereas prior value(s), if any, were not). For instance, in response to the query at the first time a knowledge graph entry corresponding to the game between "Team A and Team B" may have lacked a "time" field/node or may have included a "time" field/node with an unresponsive "unknown/unavailable" value. Subsequent to the time of the user query, the "time" field of the entry may be updated with a specific responsive value such as "19:00."

In response to determining that the given resource that satisfies the quality criteria is present and satisfies the quality criteria, content that is based on the given resource may be provided for presentation to the user via a computing device of the user. For example, the content may be provided for presentation to the user via the same computing device the user utilized to submit the query and/or via a separate computing device. The content may be provided for presentation in various forms. For example, the content may be provided as a visual and/or audible push notification on a mobile computing device of the user, and may be surfaced independent of the user again submitting the query and/or another query. Also, for example, the content may be presented as visual and/or audible output of an automated assistant during a dialog session between the user and the automated assistant, where the dialog session is unrelated to the query and/or another query seeking similar information.

Additional description of these and other implementations is now provided with reference to the figures. In FIG. 1, an example environment in which techniques disclosed herein may be implemented is illustrated. The example environment includes one or more user interface input devices 102, one or more user interface output devices 104, and a system 120.

The user interface input devices 102 may include, for example, a physical keyboard, a touch screen (e.g., implementing a virtual keyboard or other textual input mechanism), and/or a microphone. The user interface output devices 104 may include, for example, a display screen, and/or speaker(s). The user interface input and output devices 102, 104 may be incorporated on one or more computing devices of a user. For example, a mobile phone of the user may include the user interface input and output devices 102, 104; or a standalone personal assistant hardware device may include the user interface input and output devices 102, 104; or a first computing device may include the user interface input device(s) 102 and a separate computing device may include the user interface output device(s) 104; etc.

Although system 120 is illustrated in FIG. 1 as separate from the user interface output and input devices 102, 104, in some implementations all or aspects of the system 120 may be implemented on a computing device that also contains the user interface input device(s) 102 and/or the user interface output device(s) 104. For example, all or aspects of output generation engine 132 and/or query processing engine 122 of system 120 may be implemented on the computing device. In some implementations, all or aspects of the system 120 may be implemented on computing device(s) that are separate and remote from a computing device that contains the user interface input devices 102 and/or the user interface output devices 104 (e.g., all or aspects may be implemented "in the cloud"). In some of those implementations, those aspects of system 120 may communicate with the computing device via one or more networks such as a local area network (LAN) and/or wide area network (WAN) (e.g., the Internet).

Some non-limiting examples of client computing device(s) that may include the user interface input device(s) 102 and/or user interface output device(s) 104 include one or more of: a desktop computing device, a laptop computing device, a standalone hardware device at least in part dedicated to automated assistance, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a virtual or augmented reality computing device).

Additional and/or alternative client computing devices may be provided. In some implementations, a given user may communicate with all or aspects of system 120 utilizing a plurality of client computing devices that collectively form a coordinated "ecosystem" of computing devices. However, for the sake of brevity, some examples described in this disclosure will focus on the user operating a single client computing device.

A client computing device and system 120 may each (when they are separate devices) include one or more memories for storage of data and software applications, one or more processors for accessing data and executing applications, and other components that facilitate communication over a network. The operations performed by one or more of the client computing devices and/or by the system 120 may be distributed across multiple computing devices. System 120 may be implemented as, for example, computer programs running on one or more computers in one or more locations that are coupled to each other through a network.

As illustrated in FIG. 1, a user provides a query or other input to the system 120 via the user interface input device(s) 102. The system 120 provides responsive output for presentation to the user via the user interface output devices(s) 104 (optionally after further processing by one or more components). For the sake of simplicity, the input is illustrated in FIG. 1 as being provided directly to the system 120 by the user interface input device(s) 102 and the output is illustrated as being provided by the system 120 directly to the user interface output device(s) 104. However, it is noted that in various implementations one or more intermediary hardware components may be functionally interposed between the system 120 and the user interface input and/or output devices 102, 104, and may optionally process the input and/or output. For example, one or more components may process the output provided by system 120 and generate, based on the processing of the output, one or more signals for presentation of search results and/or other content via the user interface output device(s) 104. For instance, where a user interface output device 104 is on a client computing device separate from all or aspects of the system 120, a hardware processor and/or other components may process the output and generate, based on the output, signals for driving the user interface output device 104.

In some implementations, the input is textual input. In some of those implementations, the input received by the system 120 is already in a textual format. For example, the user interface input device(s) 102 may include a keyboard that generates textual input in response to user interface input directed to the keyboard, and the textual input provided to the system 120. Also, for example, the user interface input device(s) 102 may include a microphone, a voice-to-text processor that is separate from the system 120 may convert voice input received at the microphone into textual input, and the textual input may be provided to the system 120. In some other implementations, the input initially received by the system 120 is not in a textual format, but is converted to a textual format by the system 120 and provided in the textual format to one or more other components of the system 120. For instance, the user interface input device(s) 102 may include a microphone, voice input may be received at the microphone and provided to the system 120, and a voice-to-text processor of the system 120 may convert the voice input into textual input.

A client computing device may optionally operate one or more applications that enable dialog and/or other communications with the system 120. Such applications may come in various forms such as a web browser, a dedicated search application, a short messaging service ("SMS") and/or multimedia messaging service ("MMS") client, an online chat client (e.g., instant messenger, Internet relay chat, or "IRC," etc.), a messaging application associated with a social network, an automated assistant messaging service dedicated to conversations with system 120, and so forth. In some implementations, one or more of the applications may be implemented via a webpage or other resources rendered by a web browser or other application of a client computing device.

In various implementations, system 120 may include a query processing engine 122, resource criteria engine 124, a monitoring engine 126, a search engine 128, a ranking engine 130, and an output generation engine 132. In some implementations, one or more of engines 122, 124, 126, 128, 130, and/or 132 may be omitted, combined, and/or implemented in a component that is separate from system 120. For example, one or more of engines 122, 124, 126, 128, 130, and/or 132 or any operative portion thereof, may be implemented in a component that is executed by a client computing device that includes the user interface input and/or output devices 102 and 104 and that is separate from the system 120. Also, for example, the search engine 128 and/or the ranking engine 130 may be implemented in whole or in part by a system that is separate from the system 120 (e.g., a separate search system in communication with the system 120).

Query processing engine 122 processes queries, and optionally other input, that are submitted to the system 120, and generates annotated output for use by one or more other components of the system 120. For example, the query processing engine 122 may process natural language free-form textual input that is generated based on user interface input generated by a user via user interface input device(s) 102. The generated annotated output includes one or more annotations of the textual input and optionally one or more (e.g., all) of the terms of the textual input.

In some implementations, the query processing engine 122 is configured to identify and annotate various types of grammatical information in textual input. For example, the query processing engine 122 may include a part of speech tagger configured to annotate terms with their grammatical roles. Also, for example, in some implementations the query processing engine 122 may additionally and/or alternatively include a dependency parser configured to determine syntactic relationships between terms in textual input.

In some implementations, the query processing engine 122 may additionally and/or alternatively include an entity tagger configured to annotate entity references in one or more segments such as references to people, organizations, locations, and so forth. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the query processing engine 122 may additionally and/or alternatively include a coreference resolver configured to group, or "cluster," references to the same entity based on one or more contextual cues. For example, the coreference resolver may be utilized to resolve the term "it" to "Acme's widget" in the natural language input "Acme's widget, when is it going to be released?."

In some implementations, one or more components of the query processing engine 122 may rely on annotations from one or more other components of the query processing engine 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing particular textual input, one or more components of the query processing engine 122 may use related prior input and/or other related data outside of the particular textual input to determine one or more annotations. For example, a first query of a user in a dialog with the system 120 may be "search results about Acme's widget" and a subsequent query of the user may be "when is it going to be released?". In processing "when is it going to be released", the coreference resolver may resolve "it" to "Acme's widget" utilizing the prior input of "search results about Acme's widget".

The search engine 128 searches one or more search databases 154 in response to a query submitted by a user to the system 120. The search engine 128 searches the search databases 154 to identify one or more resources, if any, that are responsive to the query. In some implementations, the search databases 154 include database(s) that index publicly available resources and/or database(s) that index resources that are private to the user. The search engine 128 may utilize the databases 154 to identify responsive resources and may generate search results based on the identified responsive resources. In some implementations, one or more of the search databases 154 may be remote from the system 120 and/or any separate client computing device, and/or one or more of the search databases 154 may be local to the system 120 and/or any separate client computing device. In this specification, the term "database" is used to refer to any collection of structured or unstructured data stored in one or more computer readable media.

The search engine 128 may utilize various techniques in searching the search databases 154 in response to a query, such as conventional and/or other information retrieval techniques. The ranking engine 130 calculates scores for the resources identified by search engine 128 using one or more ranking signals, such as popularity of the resources, a degree of matching between the search parameters and the resources, attributes of the user (e.g., a location of the user, a primary language of the user), etc. The ranking engine 130 then ranks the responsive resources using the scores.

The search engine 128 uses the identified responsive resources ranked by the ranking engine 130 to generate one or more search results. The search result(s) include search result(s) corresponding to the resource(s) that are responsive to the search issued based on the query. For example, each of the search results can include a title or other synopsis of a responsive content item, a summary of the content item, a link to the responsive content item, other information related to the responsive content item, and/or even the entirety of the content item.

In some implementations, in response to a query, the search engine 128 may identify a resource that is indicated in one or more of the search databases 154 as including content that is an authoritative answer to the query. In some of those implementations, the search engine 128 may generate a search result that includes the authoritative answer and provide that search result for presentation prominently in response to the query (e.g., for presentation as the only responsive search result or presentation more prominently than other search results). For instance, an authoritative answer may be provided for visual presentation in a so-called "one box" and/or provided for audible recitation to the user (whereas content from other responsive resources, if any, may not). In some implementations, the search engine 128 may determine that an entry in a knowledge graph, or other database, includes one or more fields that indicate an authoritative answer to a query. For example, for a query "Acme's widget release date" the search engine 128 may identify a knowledge graph entry corresponding to "Acme's widget" and identify a "release date" field for that entry that indicates an authoritative release date. Such authoritative release date may be included by the search engine 128 in an authoritative answer to the query.

The ranked search result(s) generated by the search engine 128 and the ranking engine 130 are provided by the output generation engine 132 in response to the query. The output generation engine 132 provides the ranked search result(s) for presentation to the user via one or more of the user interface output device(s) 104. For example, the output generation engine 132 may provide the search results for audible and/or visual presentation via one or more of the user interface output device(s) 104. In some implementations, the system 120 may be implemented as, or be in communication with, an automated assistant that engages in dialog sessions with the user. In some of those implementations, the system 120 may receive a query from the user during a dialog session and may provide search result(s) in response to the query as part of the dialog between the user and the system 120.

The resource criteria engine 124 determines, for various queries, whether resources returned for those queries satisfy one or more criteria, such as one or more quality criteria. In some implementations, the resource criteria engine 124 utilizes one or more features of resource(s) that the search engine 128 has identified as responsive to a query to determine whether the resource(s) satisfy the quality criteria for the query. For example, the resource criteria engine 124 may determine whether a resource satisfies one or more quality criteria based on one or more search ranking signals for the resource and/or a cumulative ranking score for the resource determined by the ranking engine 130. For instance, the resource criteria engine 124 may determine that a highest ranked resource responsive to a query satisfies the quality criteria only if it has at least a threshold ranking score. As another example, the resource criteria engine 124 may determine that a resource satisfies a quality criterion only if it has an indication, in one or more of the search databases 154, as including content that is an authoritative answer to the query. As yet another example, the resource criteria engine 124 may determine that a resource satisfies a quality criterion only if it is an entry in a knowledge graph or other resource that includes a field that contains a value that indicates the desired information for the query.

In response to determining that none of the responsive resources to a query satisfy quality criteria, the resource criteria engine 124 may store data in association with the user that causes content from a subsequently identified resource, which satisfies the criteria, to be provided for presentation to the user at a future time. As described in more detail below, the monitoring engine 126 may monitor for the presence of such a resource and provide it to the output generation engine 132 for providing for presentation to the user via one or more of the user interface output device(s) 104.

In some implementations, the resource criteria engine 124 may store such data in association with the user additionally or alternatively based on determining that the query itself satisfies one or more criteria. For example, the resource criteria engine 124 may only store such data if the query itself is determined to be an interrogative query that seeks a specific answer. An interrogative query can be contrasted with a general query that seeks general information on a topic. For instance, "what time is Team A's game tonight?" is an interrogative query as it seeks a specific answer (the time of the game). On the other hand, "boxer dogs" is a general query as it seeks general information about the boxer breed of dogs.

The resource criteria engine 124 may utilize various techniques to identify a query as an interrogative query. For example, the resource criteria engine 124 may identify the query as an interrogative query based on one or more terms and/or characters in the query, such as the presence of "who", "what", "when", "where", and/or "?". Also, for example, the resource criteria engine 124 may identify the query as an interrogative query based on annotations provided by query processing engine 122. For instance, the resource criteria engine 124 may identify the query as interrogative based on it including an annotation that indicates presence of one or more types of entities, based on it including an annotation that indicates a certain syntactic structure, etc. Also, for example, for a spoken query, the resource criteria engine 124 may identify the query as an interrogative query based on one or more characteristics of the spoken input (e.g., inflection, intonation). As yet another example, the resource criteria engine 124 may identify the query as an interrogative query based on it conforming to an interrogative query template such as: a template of "what time is [event]" (where [event] indicates a group of entities such as concerts, sports games, TV shows, etc.); a template of "when is [movie] release date" (where [movie] indicates a group of entities that are of a "movie" class); a template of "when does the new [physical location] open" (where [physical location] indicates a group of physical location entities such as restaurants, businesses, etc.); etc.

In some implementations, in response to determining that no resources responsive to the query satisfy one or more criteria and/or in response to determining that the query satisfies one or more criteria, the resource criteria engine 124 may cause: output generation engine 132 to provide a prompt or other notification for presentation to the user that submitted the query. For example, the prompt may inform the user of the lack of resources that satisfy the criteria and/or inform the user that if resources that satisfy the criteria are subsequently available, associated content will be automatically provided to the user. In some of those implementations, the resource criteria engine 124 may first require an affirmative user interface input in response to the prompt before storing data in association with the user that causes content from a subsequently identified resource, which satisfies the criteria, to be provided for presentation to the user at a future time.

The monitoring engine 126 monitors for the presence of resources that are responsive to the queries identified by resource criteria engine 124 and that satisfy the one or more criteria that were not satisfied by the resources previously identified in response to the queries. In response to determining that a resource for a given query is present that satisfies the criteria, the monitoring engine 126 may communicate with the output generation engine 132 to cause content that is based on that resource to be provided to computing device(s) of user(s) that had previously submitted the given query (or a variation thereof).

The monitoring engine 126 may utilize various techniques to monitor for the presence of resources that are responsive to the queries identified by resource criteria engine 124 and that satisfy the one or more criteria that were not satisfied by the resources previously identified in response to the queries. For example, the monitoring engine 126 may resubmit a query to the search engine 128 periodically and/or at other interval(s) and communicate with resource criteria engine 124 to determine if responsive resource(s) now satisfy the criteria. As another example, the criteria may be that a resource is identified as including authoritative content for the query and the monitoring engine 126 may identify such content in response to corresponding data being stored in association with the resource (e.g., in search database 154). For instance, the monitoring engine 126 may recognize the storing of such data during the monitoring in response to receiving a notification from another component that such data has been associated with the resource for the query and/or for one or more related queries. Also, for example, the monitoring engine 126 may determine that an entry of a database (e.g., a knowledge graph) includes one or more fields that have been updated to include value(s) that now indicate desired information for the query (whereas prior value(s) if any, were not).

In response to determining that a given resource that satisfies the quality criteria is present and satisfies the quality criteria, the output generation engine 132 may provide content that is based on the given resource for presentation to the user via a computing device of the user. For example, the content may be provided for presentation to the user via the same computing device the user utilized to submit the query and/or via a separate computing device. The content may be provided for presentation in various forms. For example, the content may be provided as a visual and/or audible push notification on a mobile computing device of the user, and may be surfaced independent of the user again submitting the query and/or another query. Also, for example, the content may be presented as visual and/or audible output of an automated assistant during a dialog session between the user and the automated assistant, where the dialog session is unrelated to the query and/or another query seeking similar information.

Figure 2:
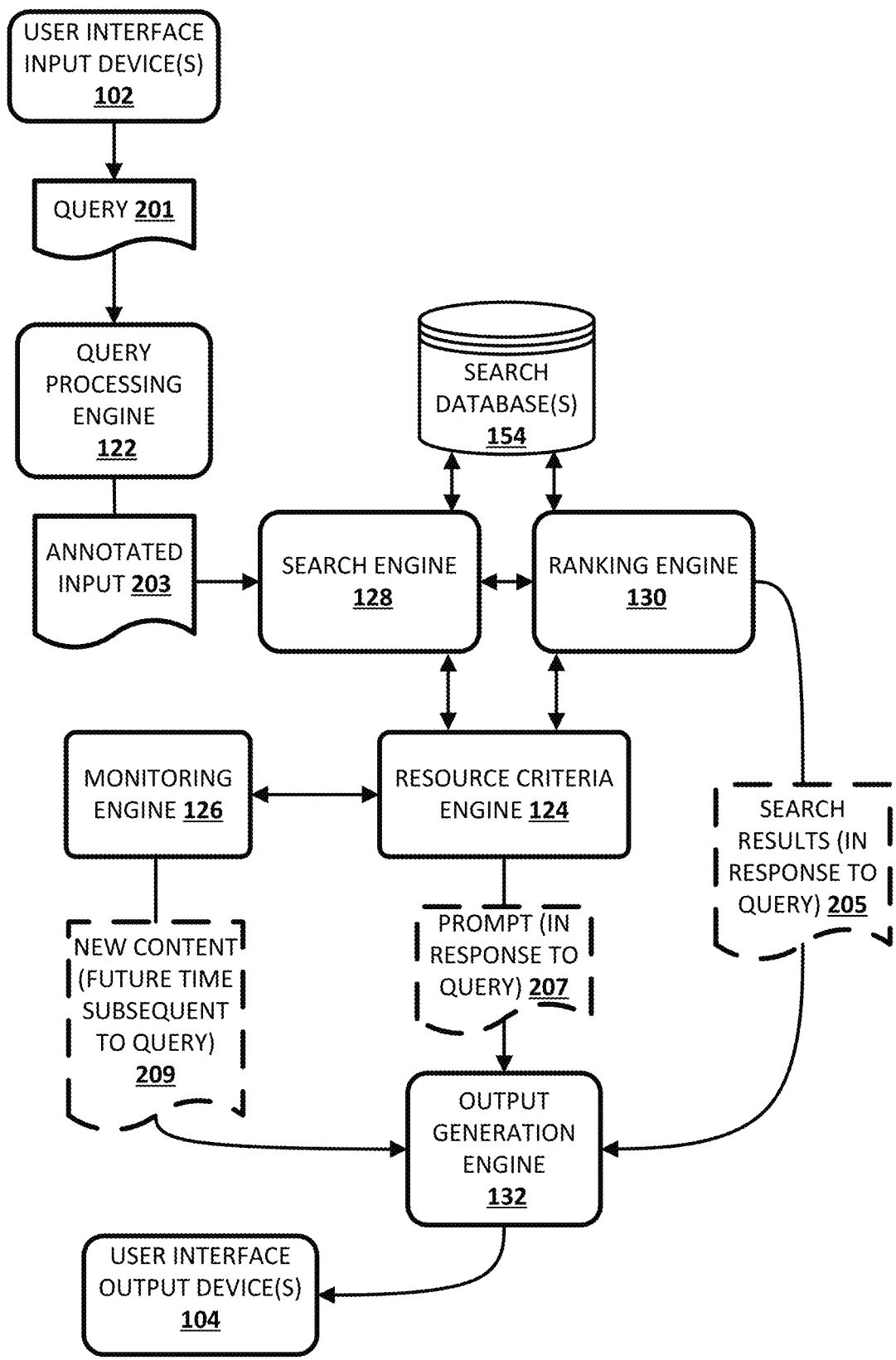
FIG. 2 illustrates an example of how various components of the example environment of FIG. 1 may interact according to implementations disclosed herein.

Turning now to FIG. 2, additional description is provided of various components of system 120. In FIG. 2, the query processing engine 122 receives a query 201 that is based on user interface input generated by one of the user interface input device(s) 102. The query processing engine 122 generates annotated input 203 that includes annotations of the query 201 input and/or terms of the query 201 itself. The search engine 128 utilizes the annotated input 203 to determine search parameters, issues a search of one or more of the search databases 154 based on the search parameters, and identifies resources (if any) that are responsive to the search. The ranking engine 130 ranks the responsive resources (if any) utilizing one or more signals.

If responsive resources are returned and/or satisfy a threshold ranking, the ranking engine 130 provides the search results 205 to the output generation engine 132 for providing in response to the query 201. For example, the output generation engine 132 may provide the search results 205 for presentation via one or more of the user interface output device(s) 104.

The resource criteria engine 124 communicates with the search engine 128, the ranking engine 130, and/or the search databases 154 to determine whether the resources (if any) responsive to the query 201 satisfy one or more criteria. If they do, the resource criteria engine 124 may perform no further action for the query 201.

However, if they don't, the resource criteria engine 124 may store data in association with the user that causes content from a subsequently identified resource, which satisfies the criteria, to be provided for presentation to the user at a future time. In some implementations, prior to storing such data the resource criteria engine 124 may provide a prompt 207 to the output generation engine 132 for providing in response to the query 201. The prompt 207 may inform the user of the lack of resources that satisfy the criteria and/or inform the user that if resources that satisfy the criteria are subsequently available, associated content will be automatically provided to the user. In some of those implementations, the resource criteria engine 124 may first require an affirmative user interface input in response to the prompt 207 before storing the data in association with the user.

The monitoring engine 126 may monitor, over a time period, for the presence of a resource that is responsive to the query and that satisfies the criteria. Based on determining such a resource is present at a future time, and based on the data having been stored in association with the user by the resource criteria engine 124, the monitoring engine 126 may provide new content 209 to the output generation engine 132 for providing for presentation to the user via one or more of the user interface output device(s) 104. The output generation engine 132 provides the new content 209 for presentation to the user via one of the user interface output device(s) 104 (which may be part of a different computing device than the computing device utilized to submit the query 201).

Referring now to FIGS. 3A-6, various examples of implementations of the system 120 are described. FIGS. 3A, 3B, 4A, 4B, 5A, and 5B each illustrate a computing device 110 with a display screen 140 displaying examples of interactions that may occur between a user of the computing device 110 and the system 120 according to implementations disclosed herein. One or more aspects of the system 120 may be implemented on the computing device 110 and/or on one or more computing devices that are in network communication with the computing device 110.

The display screen 140 of FIGS. 3A, 3B, 4A, 4B, 5A, and 5B further includes a textual input interface element 188 that the user may select to generate user interface input via a virtual keyboard and a voice input interface element 189 that the user may select to generate user interface input via a microphone. In some implementations, the user may generate user interface input via the microphone without selection of the voice input interface element 189. For example, during the dialog, active monitoring for audible user interface input via the microphone may occur to obviate the need for the user to select the voice input interface element 189. In some of those and/or in other implementations, the voice input interface element 189 may be omitted. Moreover, in some implementations, the textual input interface element 188 may additionally and/or alternatively be omitted (e.g., the user may only provide audible user interface input). The display screen 140 of FIGS. 3A, 3B, 4A, 4B, 5A, and 5B also includes system interface elements 181, 182, 183 that may be interacted with by the user to cause the computing device 110 to perform one or more actions.

Figure 6:
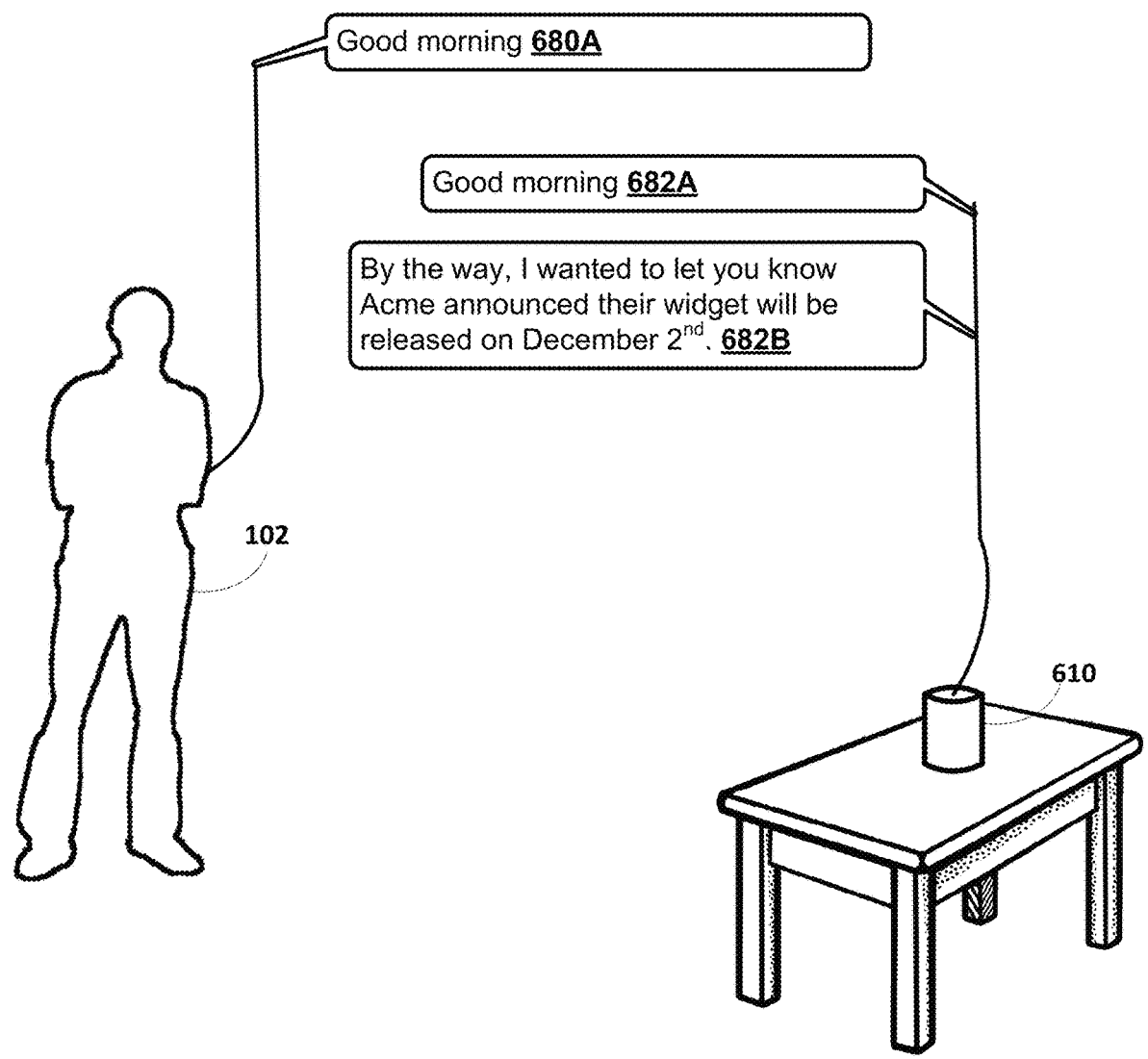
FIG. 6 illustrates another example client computing device, and an example of: audibly presenting content in a dialog session with an automated assistant. The content is based on a resource that is responsive, at the time of FIG. 6, to a prior query of the user. The content is provided based on the resource satisfying one or more criteria and based on resources responsive to the prior query at the time of the prior query not satisfying the criteria.

FIG. 6 illustrates a computing device 610 that includes one or more microphones and one or more speakers and illustrates examples of dialog that may occur, via the microphone(s) and speaker(s), between a user 102 of the computing device 610 and the system 120 according to implementations described herein. One or more aspects of the system 120 may be implemented on the computing device 610 and/or on one or more computing devices that are in network communication with the computing device 610.

Figure 3A:
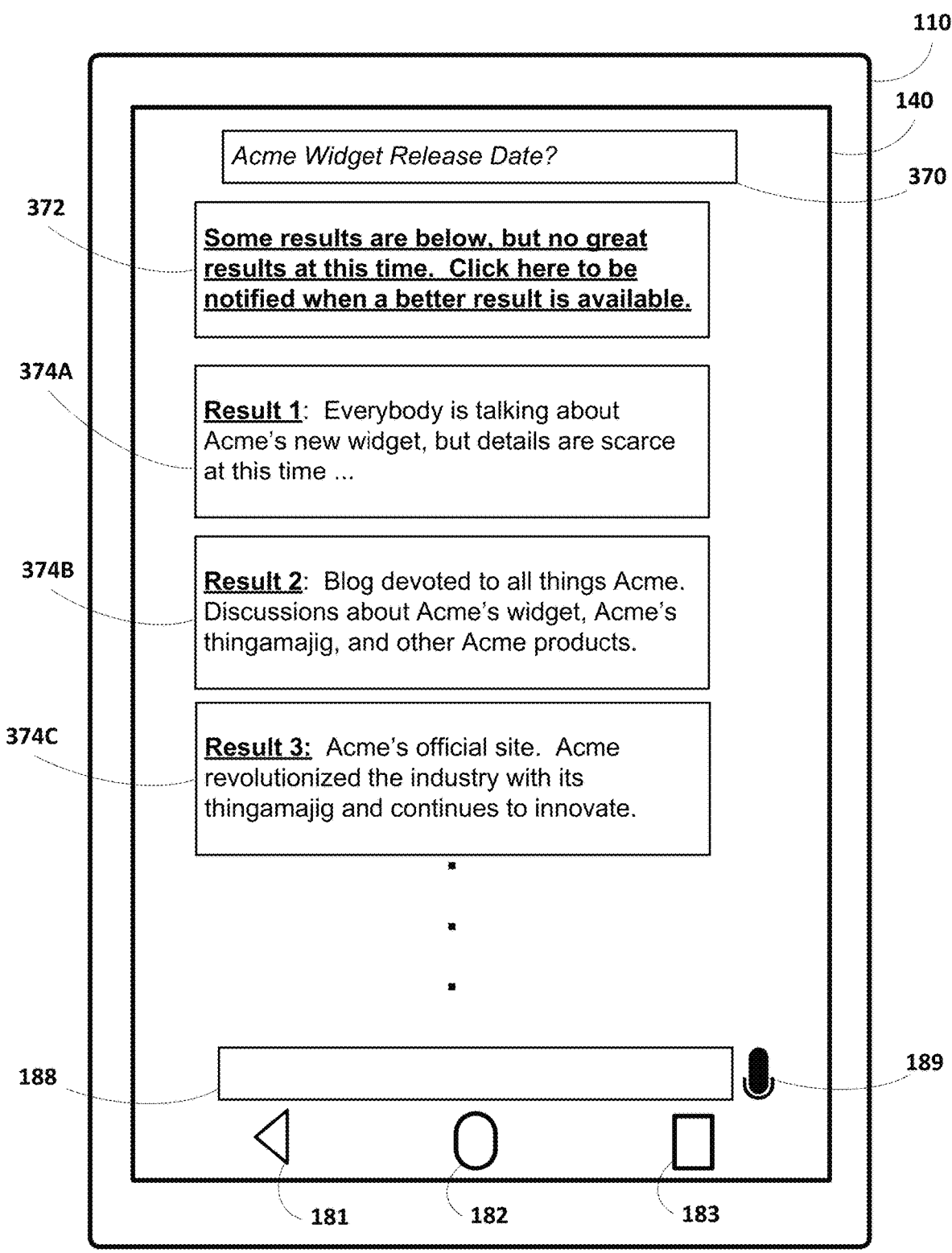
FIG. 3A illustrates an example client computing device. A display screen of the example client computing device is displaying an example of: a query, and a prompt and search results that may be provided in response to the query.

In FIG. 3A, the user has submitted a query of "Acme Widget Release Date" as shown in search query interface element 370. In response to the query, the system 120 obtains resources that are responsive to the query and provides search results 374A-C that are based on those resources for presentation on the display screen 140. The system 120 has further determined that the responsive resources fail to satisfy one or more criteria and, as a result, provides prompt 372 for presentation along with the search results 374A-C. The prompt 372 notifies the user that no "great results" are available and solicits the user to select the prompt 372 to be notified when a "better" result is available.

In response to the user selecting the prompt 372, the system 120 may provide the user with a "better" result in the future after the system 120 has determined the presence of such a result. An example of this is illustrated in FIG. 3B.

Figure 3B:
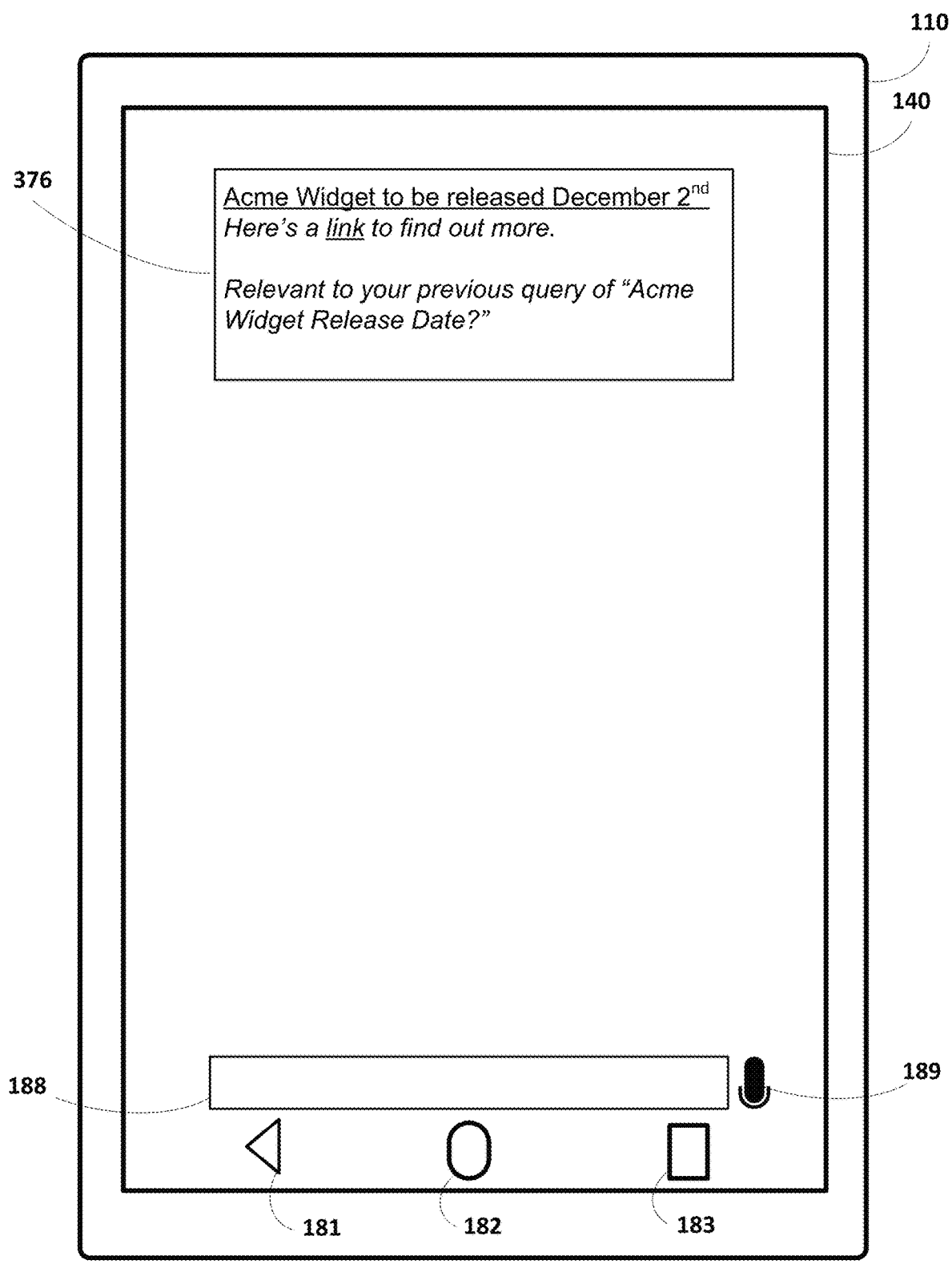
FIG. 3B illustrates the example client computing device of FIG. 3A at a time that is subsequent to that of FIG. 3A. The display screen in FIG. 3B is displaying an example of content that is based on a resource that is responsive to the query of FIG. 3A at the time of FIG. 3B, and that is provided based on the resource satisfying one or more criteria and based on resources responsive to the query at the time of FIG. 3A not satisfying the criteria.

FIG. 3B illustrates the client computing 110 device of FIG. 3A at a time that is subsequent to that of FIG. 3A. The display screen 140 in FIG. 3B is displaying an example of content 376 that is based on a resource that is responsive to the query of FIG. 3A at the time of FIG. 3B. The system 120 provides the content 376 for presentation based on the resource satisfying one or more criteria, based on resources responsive to the query at the time of FIG. 3A not satisfying the criteria, and based on the user selecting the prompt 372 of FIG. 3A.

Figure 4A:
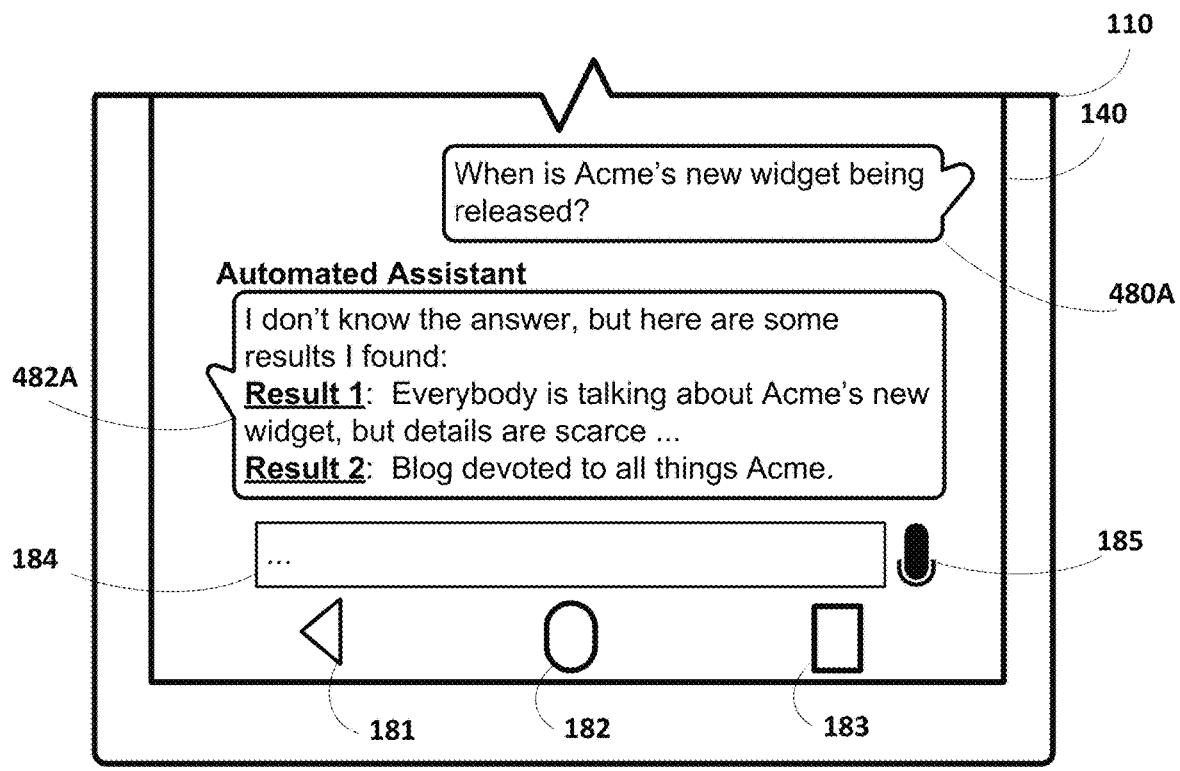
FIG. 4A illustrates the example client computing device of FIG. 3A, with the display screen displaying an example of: a query provided in a dialog session with an automated assistant, and search results that may be provided in response to the query during the dialog session.
Figure 4B:
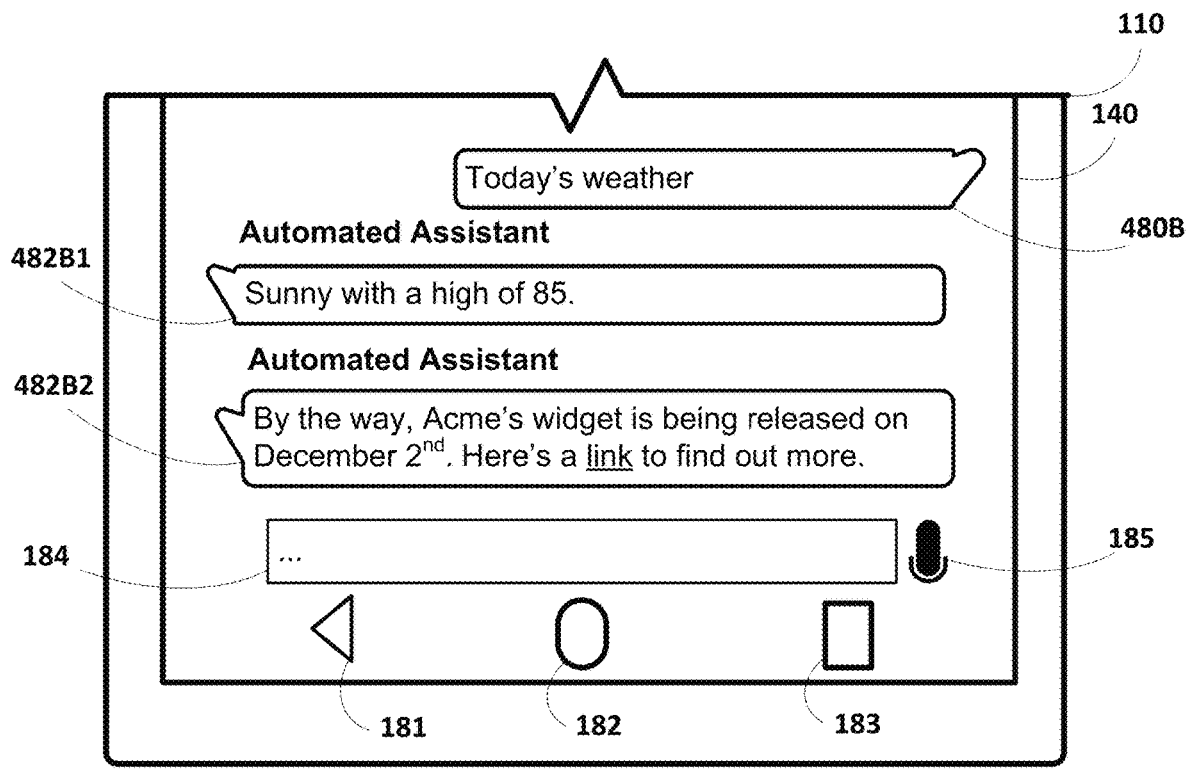
FIG. 4B illustrates the example client computing device at a time that is subsequent to that of FIG. 4A. The display screen in FIG. 4B is displaying, during another dialog session with the automated assistant, another example of content. The content is based on a resource that is responsive to the query of FIG. 4A at the time of FIG. 4B, and is provided based on the resource satisfying one or more criteria and based on resources responsive to the query at the time of FIG. 4A not satisfying the criteria.

FIGS. 4A and 4B illustrate another example that may occur in lieu of the example of FIGS. 3A and 3B. In FIGS. 4A and 4B, the user of the client computing device 110 is engaged in "chat type" dialog sessions with an automated assistant. The automated assistant may be implemented, in whole or in part, by the system 120 and/or may interface with the system 120.

In FIG. 4A, the user provides a query 480A as part of the dialog session of FIG. 4A. In response to the query 480A, the system 120 obtains resources that are responsive to the query 480A and provides a responsive reply 482A that notifies the user that an explicit answer to the query 480A is not known, but that also provides two search results that are based on two of the resources that are responsive to the query 480A. The system 120 further determines that the resources responsive to the query 480A fail to satisfy one or more criteria.

In FIG. 4B, the user is engaged in another dialog session that occurs subsequent to the dialog session of FIG. 4A. In the dialog session of FIG. 4B, the user provides a query 480B of "Today's weather". The system 120 obtains a resource that is responsive to the query 480B and provides a responsive reply 482B1 that is based on the resource.

The system 120 then provides a further reply 482B2 that is based on a resource responsive to the query of FIG. 4A at the time of FIG. 4B. The system 120 provides the further reply 482B2 for presentation based on the resource satisfying one or more criteria, and based on resources responsive to the query at the time of FIG. 4A not satisfying the criteria.

It is noted that in the example of FIGS. 4A and 4B, the system provides the reply 482B2 without providing a prompt to the user in FIG. 4A and/or otherwise requiring that the user affirm a desire to receive content in the future that relates to the query 480A. It is further noted that in FIG. 4B, the system 120 provides the reply 482B2 immediately following the reply 482B1 to the query 480B, even though the reply 482B2 is not responsive to the query 480B. In some of those implementations, the system 120 may await for the user to engage in a dialog session with the automated assistant before providing the reply 482B2—and/or may provide the reply 482B2 even though the dialog session does not relate to the reply 482B2 and/or the query 480A (i.e., as in FIG. 4B). In some of those implementations, this may enable the system 120 to provide the reply 482B2 while the user is already engaged in a dialog session, which may reduce disturbance to the user and/or the use of computational resources that may otherwise occur if a "push" notification such as that of FIG. 3B were instead provided. In some implementations, the system 120 may provide the reply 482B2 in the dialog session of FIG. 4B based on determining that it is a separate dialog session from that of FIG. 4A.

As used herein, a "dialog session" may include a logically-self-contained exchange of one or more messages between a user and an automated assistant. The automated assistant may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of the automated assistant, and so forth.

Figure 5A:
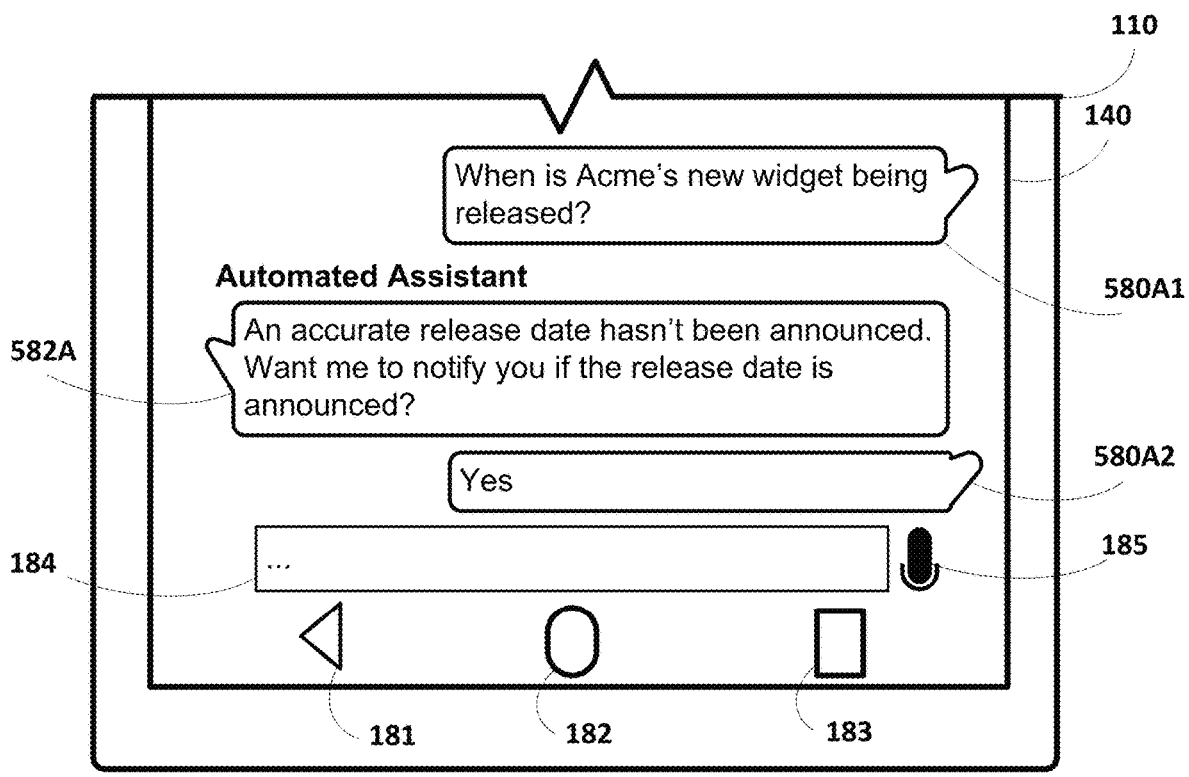
FIG. 5A illustrates the example client computing device of FIG. 3A, with the display screen displaying another example of: a query provided in a dialog session with an automated assistant, and a prompt that may be provided in response to the query during the dialog session.
Figure 5B:
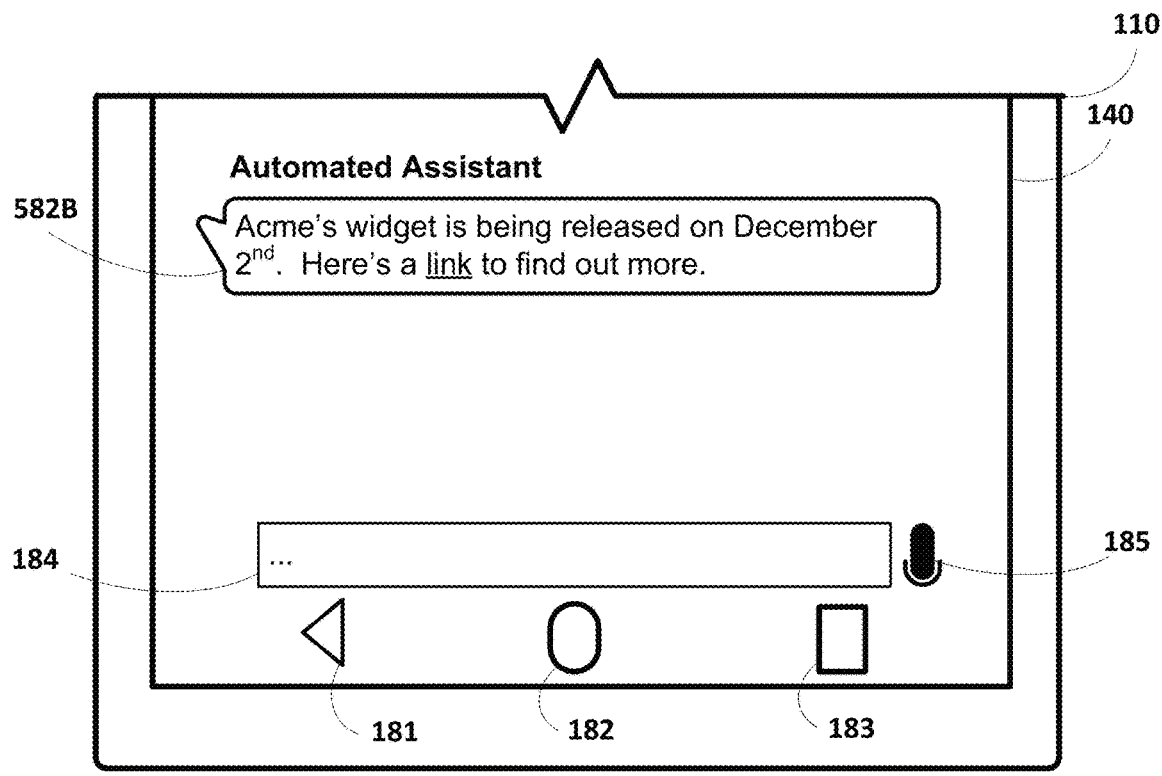
FIG. 5B illustrates the example client computing device at a time that is subsequent to that of FIG. 5A. The display screen in FIG. 5B is displaying, during another dialog session with the automated assistant, another example of content that is based on a resource that is responsive to the query of FIG. 5A at the time of FIG. 5B, and that is provided based on the resource satisfying one or more criteria and based on resources responsive to the query at the time of FIG. 5A not satisfying the criteria.

FIGS. 5A and 5B illustrate another example that may occur in lieu of the example of FIGS. 3A and 3B and the example of FIGS. 4A and 4B. In FIGS. 5A and 5B, the user of the client computing device 110 is engaged in "chat type" dialog sessions with an automated assistant. The automated assistant may be implemented, in whole or in part, by the system 120 and/or may interface with the system 120.

In FIG. 5A, the user provides a query 580A1 as part of the dialog session of FIG. 5A. In response to the query 580A1, the system 120 determines that any obtained resources that are responsive to the query 580A1 do not satisfy one or more quality criteria. In response to determining the resources do not satisfy the quality criteria, the system 120 provides a responsive reply 582A that notifies the user that an explicit answer to the query 580A is not known, and that provides a prompt to the user that solicits the user to whether the user desires to be notified when the release date is announced. The user provides further input 580A2 that affirms the user desires to be notified when the release date is announced.

In FIG. 5B, the user is engaged in another dialog session that occurs subsequent to the dialog session of FIG. 5A. In the dialog session of FIG. 5B, the system 120 provides content 582B that is based on a resource responsive to the query of FIG. 5A at the time of FIG. 5B. In FIG. 5B, the system 120 provides the content 582B for presentation based on the resource satisfying one or more criteria, based on resources responsive to the query at the time of FIG. 5A not satisfying the criteria, and based on the further input 580A1 of FIG. 5A. It is noted that in FIG. 5B, the system 120 provides the content 582B in response to accessing an application of the computing device 110 that enables the dialog session with the automated assistant, but prior to the user providing any user interface input in the dialog session. In some of those implementations, this may enable the system 120 to provide the content 582B while the user is preparing to engage in a dialog session, which may reduce disturbance to the user and/or the use of computational resources that may otherwise occur if a "push" notification such as that of FIG. 3B were instead provided.

FIG. 6 illustrates an example that may occur following FIGS. 3A, 4A, and/or 5A and that may occur in lieu of FIGS. 3B, 4B, and/or 5B.

In FIG. 6, the user 102 (which is the same user as that of the client computing device 101) provides spoken input 680A as part of a dialog between the user and an automated assistant implemented in whole or in part by the computing device 610 and/or the system 120. In response to the spoken input 680A, the automated assistant provides a responsive reply 682A for audible presentation via a speaker of the computing device 610.

The automated assistant then provides a further reply 682B that is based on a resource that is responsive to a prior query (e.g., the query of FIG. 3A, 4A, or 5A) at the time of FIG. 6. The automated assistant provides the further reply 682B for presentation based on the system 120 determining that the resource satisfies one or more criteria, and based on resources responsive to the prior query not satisfying the criteria at the time of the prior query. It is noted that in FIG. 6, the automated assistant provides the reply 682B immediately following the reply 682A to the spoken input 680A, even though the reply 682B is not responsive to the spoken input 680A. In some of those implementations, the system 120 may await for the user to engage in a dialog session with the automated assistant before providing the reply 682B—and/or may provide the reply 682B even though the dialog session does not relate to the reply 682B and/or the prior query. Although FIG. 6 only illustrates audibly providing content that is based on the subsequently determined resource, it is understood that the initial query and corresponding interaction may also occur audibly via the computing device 610 and/or other computing device.

Figure 7:
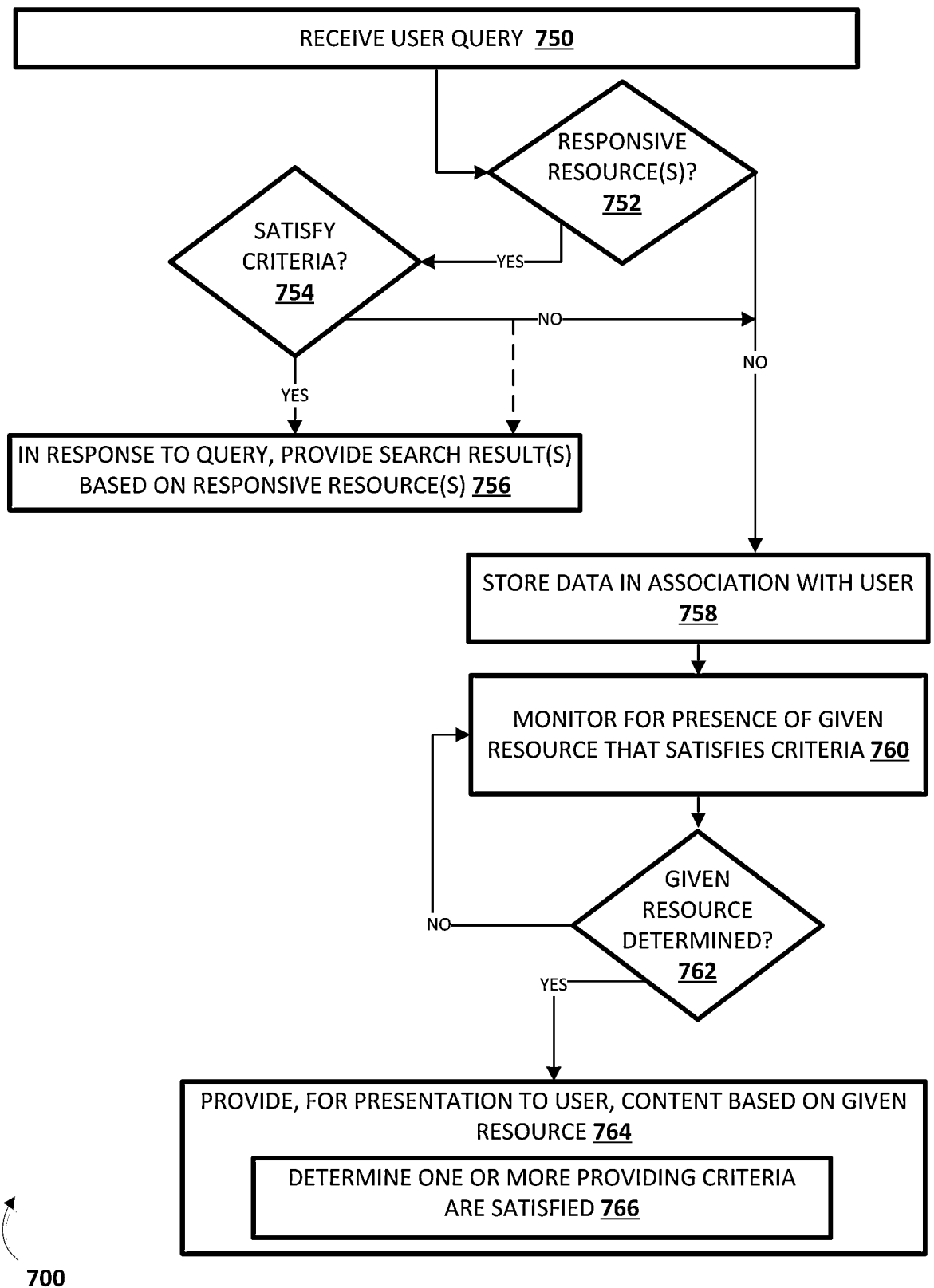
FIG. 7 is a flowchart illustrating an example method according to implementations disclosed herein.

FIG. 7 is a flowchart illustrating an example method 700 according to implementations disclosed herein. For convenience, the operations of the flow chart are described with reference to a system that performs the operations. This system may include various components of various computer systems, such as system 120. Moreover, while operations of method 700 are shown in a particular order, this is not meant to be limiting. One or more operations may be reordered, omitted or added.

At block 750, the system receives a user query.

At block 752, the system determines whether there are responsive resources to the user query. If the system determines there are not responsive resources to the user query, the system proceeds to block 758. Block 758 is described in more detail below.

If at block 752 the system determines there are responsive resources to the user query, the system proceeds to block 754. At block 754, the system determines whether any of the responsive resources satisfy one or more criteria. If the system determines one or more of the responsive resources satisfy the criteria, the system proceeds to block 756 and the method 700 then ends. At block 756 the system provides, in response to the query, search results that are based on one or more of the responsive resources.

If at block 754 the system determines that none of the responsive resources satisfy the criteria, the system proceeds to block 758 and the system may optionally also proceed to block 756.

At block 758, the system stores data in association with the user that causes content from a subsequently identified resource, that satisfies the criteria, to be provided for presentation to the user at a future time.

At block 760, the system monitors for the presence of a given resource that is responsive to the query of block 750 and that satisfies the criteria. At block 762 it is determined whether a given resource has been determined. If not, the system continues to monitor at block 760.

If so, the system proceeds to block 764. At block 764, the system provides, for presentation to the user, content that is based on the given resource. At block 764, the system may provide the content to the user based on the data stored in association with the user at block 758. Block 764 occurs at a time that is temporally separated (e.g., by hours, days, or weeks) from block 750 and/or block 756 (if performed).

In some implementations, block 764 is performed based on determining, at block 766, that one or more providing criteria are satisfied. Various providing criteria may be utilized, such as the user having engaged in a dialog session with an automated assistant, having opened a particular application (e.g., one that enables a dialog session with an automated assistant), and/or other providing criteria.

Figure 8:
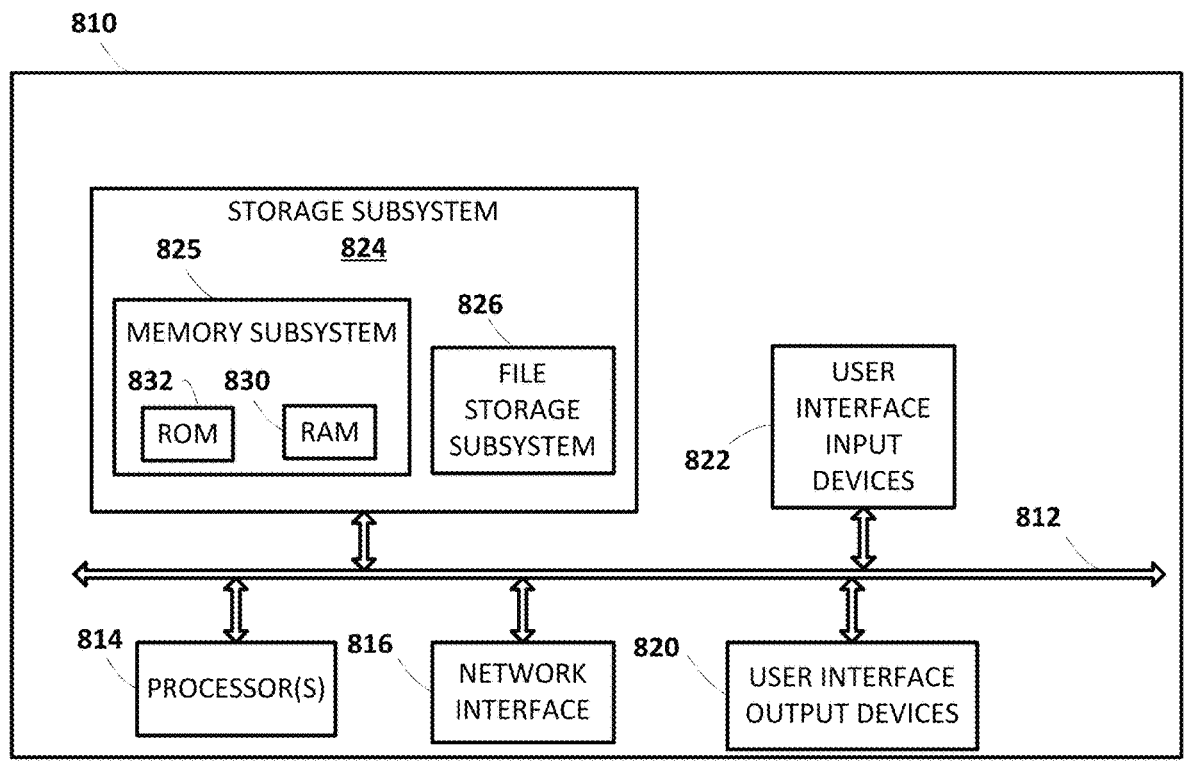
FIG. 8 illustrates an example architecture of a computing device.

FIG. 8 is a block diagram of an example computing device 810 that may optionally be utilized to perform one or more aspects of techniques described herein. In some implementations, one or more of a client computing device, system 120, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIG. 7.

These software modules are generally executed by processor 814 alone or in combination with other processors. Memory 825 used in the storage subsystem 824 can include a number of memories including a main random access memory (RAM) 630 for storage of instructions and data during program execution and a read only memory (ROM)

632 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
   in a dialog session between a user and an automated assistant implemented by one or more of the processors:
   receiving a spoken query from the user as part of the dialog session, the spoken query being directed to the automated assistant as part of the dialog session;
   identifying, based on the spoken query, an entry, of a knowledge graph, that is responsive to the spoken query;
   determining that the entry of the knowledge graph lacks an authoritative answer to the spoken query;
   in response to determining that the entry of the knowledge graph lacks the authoritative answer to the spoken query:
      providing, in response to the spoken query, user interface output that notifies the user that an explicit answer to the spoken query is not known; and
      monitoring for an update, to the entry of the knowledge graph, that includes an addition of the authoritative answer to the spoken query;
   in response to determining, during the monitoring, the update to the entry that includes the addition of the authoritative answer to the spoken query:
   awaiting for the user to engage in a subsequent dialog session with the automated assistant;
   based on the user engaging in the subsequent dialog session:
      receiving further user interface input from the user as part of the subsequent dialog session, wherein the further user interface input is unrelated to the spoken query of the dialog session;
      providing, for presentation to the user as output from the automated assistant as part of the subsequent dialog session, initial responsive output that comprises audible output and that is responsive to the further user interface input; and
      providing, in the subsequent dialog session for presentation to the user as output from the automated assistant as part of the subsequent dialog session, the authoritative answer to the spoken query,
         wherein providing the authoritative answer to the spoken query is based on receiving the further user interface input, occurs immediately following providing the initial responsive output, and occurs without receiving any additional input provided by the user after the further user interface input.

2. The method of claim 1, wherein the authoritative answer includes a date of an event.

3. The method of claim 2, wherein the authoritative answer includes a time of the event.

4. The method of claim 1, wherein the authoritative answer includes a time of an event.

5. The method of claim 1, wherein the entry, of the knowledge graph, that is responsive to the spoken query is for an event and wherein the event includes one of a concert, a sports game, and a television show.

6. A system comprising:
   one or more storage devices storing instructions;
   one or more processors operable to execute the instructions to:

in a dialog session between a user and an automated assistant implemented by one or more of the processors:
    receive a spoken query from the user as part of the dialog session, the spoken query being directed to the automated assistant as part of the dialog session;
    identify, based on the spoken query, an entry, of a knowledge graph, that is responsive to the spoken query;
    determine that the entry of the knowledge graph lacks an authoritative answer to the spoken query;
    in response to determining that the entry of the knowledge graph lacks the authoritative answer to the spoken query:
        provide, in response to the spoken query, user interface output that notifies the user that an explicit answer to the spoken query is not known; and
        monitor for an update, to the entry of the knowledge graph, that includes an addition of the authoritative answer to the spoken query;
    in response to determining, during the monitoring, the update to the entry that includes the addition of the authoritative answer to the spoken query:
        await for the user to engage in a subsequent dialog session with the automated assistant;
    based on the user engaging in the subsequent dialog session:
        receive further user interface input from the user as part of the subsequent dialog session, wherein the further user interface input is unrelated to the spoken query of the dialog session;
        provide, for presentation to the user as output from the automated assistant as part of the subsequent dialog session, initial responsive output that comprises audible output and that is responsive to the further user interface input; and
        provide, in the subsequent dialog session for presentation to the user as output from the automated assistant as part of the subsequent dialog session, the authoritative answer to the spoken query,
        wherein providing the authoritative answer to the spoken query is based on receiving the further user interface input, occurs immediately following providing the initial responsive output, and occurs without receiving any additional input provided by the user after the further user interface input.

7. The system of claim 6, wherein the authoritative answer includes a date of an event.

8. The system of claim 7, wherein the authoritative answer includes a time of the event.

9. The system of claim 8, wherein the event includes one of a concert, a sports game, and a television show.

10. The system of claim 6, wherein the entry, of the knowledge graph, that is responsive to the spoken query is for an event and wherein the event includes one of a concert, a sports game, and a television show.

11. A non-transitory computer readable medium storing instructions that, when executed by one or more processors, cause performance of a method comprising:
    in a dialog session between a user and an automated assistant implemented by one or more of the processors:
        receiving a spoken query from the user as part of the dialog session, the spoken query being directed to the automated assistant as part of the dialog session;
        identifying, based on the spoken query, an entry, of a knowledge graph, that is responsive to the spoken query;
        determining that the entry of the knowledge graph lacks an authoritative answer to the spoken query;
        in response to determining that the entry of the knowledge graph lacks the authoritative answer to the spoken query:
            providing, in response to the spoken query, user interface output that notifies the user that an explicit answer to the spoken query is not known; and
            monitoring for an update, to the entry of the knowledge graph, that includes an addition of the authoritative answer to the spoken query;
    in response to determining, during the monitoring, the update to the entry that includes the addition of the authoritative answer to the spoken query:
        awaiting for the user to engage in a subsequent dialog session with the automated assistant;
    based on the user engaging in the subsequent dialog session:
        receiving further user interface input from the user as part of the subsequent dialog session, wherein the further user interface input is unrelated to the spoken query of the dialog session;
        providing, for presentation to the user as output from the automated assistant as part of the subsequent dialog session, initial responsive output that comprises audible output and that is responsive to the further user interface input; and
        providing, in the subsequent dialog session for presentation to the user as output from the automated assistant as part of the subsequent dialog session, the authoritative answer to the spoken query,
        wherein providing the authoritative answer to the spoken query is based on receiving the further user interface input, occurs immediately following providing the initial responsive output, and occurs without receiving any additional input provided by the user after the further user interface input.

12. The non-transitory computer readable medium of claim 11, wherein the authoritative answer includes a date of an event.

13. The non-transitory computer readable medium of claim 12, wherein the authoritative answer includes a time of the event.

14. The non-transitory computer readable medium of claim 11, wherein the authoritative answer includes a time of an event.

15. The non-transitory computer readable medium of claim 11, wherein the entry, of the knowledge graph, that is responsive to the spoken query is for an event.

* * * * *